United States Patent [19]

Wittman

[11] 3,860,785
[45] Jan. 14, 1975

[54] GROUNDING DEVICE FOR ELECTRIC WELDING

[75] Inventor: Eric W. Wittman, Houston, Tex.

[73] Assignee: CRC-Crose International, Inc., Houston, Tex.

[22] Filed: Feb. 1, 1974

[21] Appl. No.: 438,537

[52] U.S. Cl............................. 219/136, 339/266 G
[51] Int. Cl....... B23k 9/00, H01r 13/24, H01r 9/06
[58] Field of Search........... 219/136; 339/14 L, 251, 339/95 R, 263 L, 266 G, 274

[56] References Cited
UNITED STATES PATENTS

| | | | |
|---|---|---|---|
| 758,057 | 4/1904 | Fuller et al. | 339/251 |
| 2,260,136 | 10/1941 | Bergan | 339/263 L X |
| 2,396,119 | 3/1946 | O'Neil | 219/136 X |

*Primary Examiner*—J. V. Truhe
*Assistant Examiner*—Kenneth Hairston
*Attorney, Agent, or Firm*—Edwin M. Thomas

[57] ABSTRACT

A grounding device designed to fit into the weld groove between two adjacent work pieces, such as lengths of pipe, is held in place by having one end anchored under a firm holder in form of a tight band surrounding one of the work pieces and annularly spaced therefrom. Contact at the joint is maintained by use of a selectively movable eccentric which can be released to break the contact and for shifting the ground to another location. The grounding contacts (a plurality are preferred) is shaped to fit the surface of the welding grove accurately, minimizing resistance at the points of contact and avoiding pitting due to arcing.

10 Claims, 6 Drawing Figures

PATENTED JAN 14 1975 3,860,785
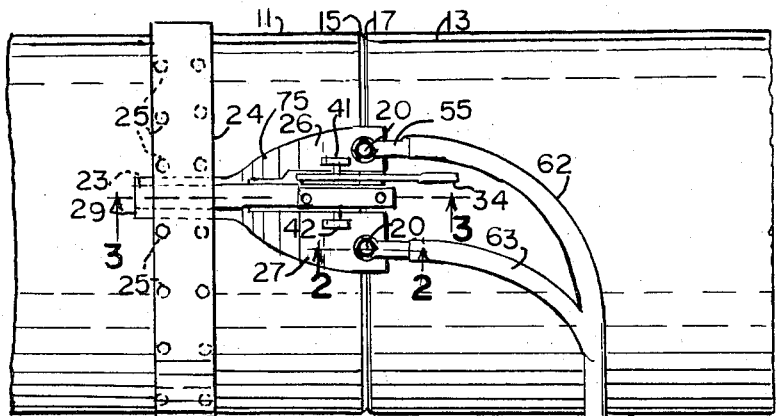
Fig. 1
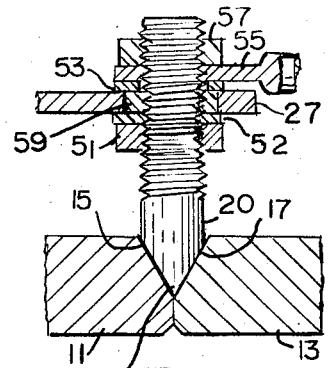
Fig. 2
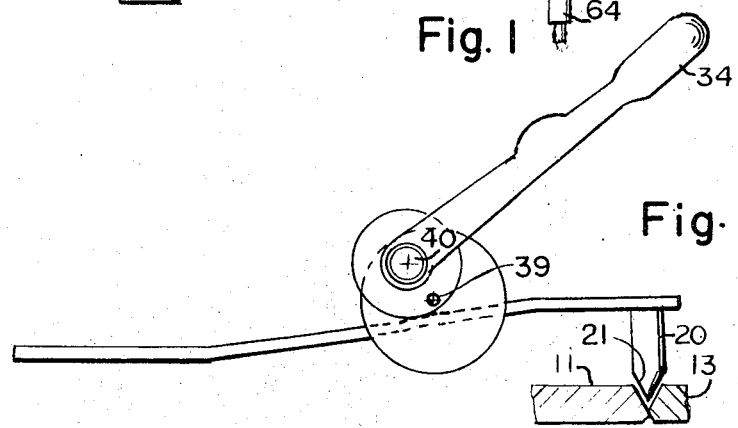
Fig. 5
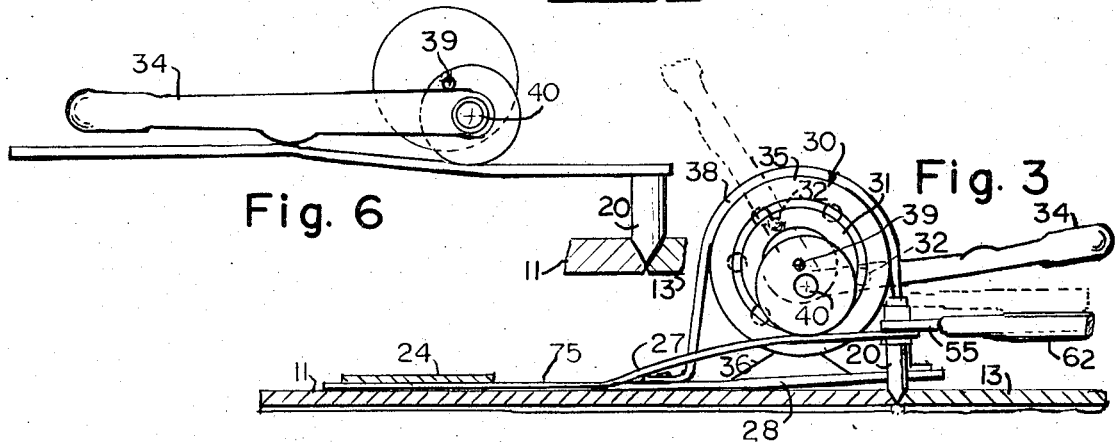
Fig. 6 / Fig. 3
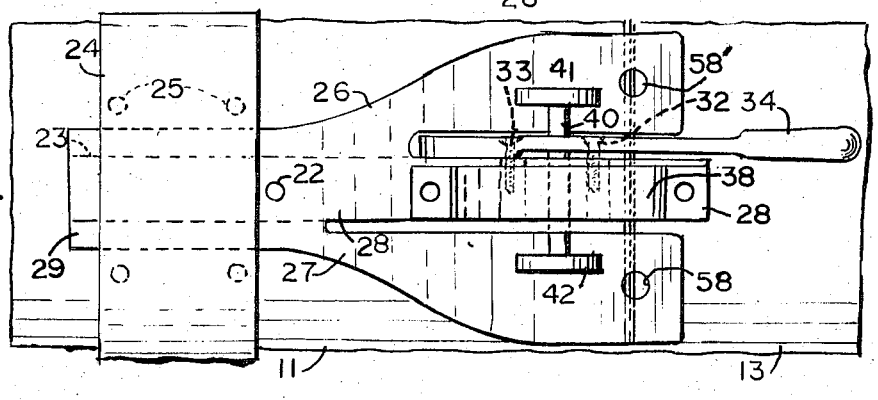
Fig. 4

GROUNDING DEVICE FOR ELECTRIC WELDING

BACKGROUND AND PRIOR ART

Various grounding devices have been proposed in the prior art for use in electric welding of joints in pipelines and in analogous work where high quality welds are required. Some of the welding codes, particularly for major pipelines, require that the ground contact be made at the joint and not elsewhere on the work piece. Beveled surfaces commonly are provided at joints where the wleds are to be made. It has been proposed previously to use, as contact elements, wedge shaped shoes which are held against the joint in various ways. Most of the prior devices have been crude and cumbersome, utilizing strings, magnets, straps, and various other holding devices to maintain pressure on the contact element, which is necessary to prevent arcing and consequent pitting at the point of contact. Welding currents are typically very heavy, of the order of hundreds of amperes, and these can cause damage very quickly if the ground is poor.

With the advent of automatic welding, where the emphasis is necessarily on speed of operations, the prior devices, to the best of the inventors' knowledge, are awkward and inconvenient, being poorly adapted for rapid automatic operations. For example, in U.S. Pat. Nos. 3,461,264 to Nelson and Sims, and in 3,604,612 to Miller and Nelson, also in U.S. Application of Nelson et al., Ser. No. 254,192 filed May 17, 1972, now U.S. Pat. No. 3,806,694, systems for welding are described in which the girth weld between lengths of large diameter pipes, as used in building pipelines, is made automatically by traveling welding mechanism which moves in an orbital path around the pipe body. Obviously, in order to complete such welded joint, any grounding device applied to the actual welding surface, which application is usually required to insure against pitting of the pipe wall due to poor grounding, must be capable of being removed readily from the path of the welding machine and quickly replaced at another point so that welding can proceed with minimum interruption. Devices held by straps, chains, magnets, etc., often are not held as securely as is desirable and/or the time required to remove and relocate them is too great for efficient operation.

Therefore, an object of the present invention is to make available a clean and sure contact device which carries its own means for firmly maintaining contact and which can be removed and relocated or replaced very quickly. The present invention makes use of the type of guide band described in the Miller and Nelson patent mentioned above. The invention is particularly suitable for use with the tensioned guiding band designed as a control track for the welding machine, although it can be used with other bands or equivalent retaining means which surround the work piece. The ground device is provided with a cantilever part or equivalent which can be inserted between the band and the surface of the work piece, such as a length of pipe, and with a relatively movable self-clamping or tensioning means, such as an eccentric or toggle, or equivalent, which, in effect, bears against the cantilever element to place pressure or tension on the actual contact point. This insures that the ground element will make clean and full contact and thus carry the current with minimum resistance. It prevents arcing at the ground, with the consequent pitting and analogous surface damage which such arcing causes.

The tensioning means is of quick-acting over-center type and the whole device can be placed on the joint, with clean, firm contact, under tension or pressure which firmly holds the whole device to the work, within a second or two of time. Typical prior art devices take at least several times as long; many of them, e.g., those of magnetic types, cannot be placed under satisfactory pressure or tension to insure good grounding.

BRIEF DESCRIPTION OF DRAWINGS

FIG. 1 shows the device of the present invention on a relatively small scale as applied to a girth joint in automatic pipeline welding.

FIG. 2 is an enlarged sectional detail view, showing a contact element per se and associated parts, taken substantially on the line 2—2 of FIG. 1.

FIG. 3 is a front view or elevation on a larger scale showing the tensioning eccentric or pressure mechanism which holds the contact or contacts in place during use.

FIG. 4 is a top or plan view of the device of FIG. 3, with certain parts omitted, being also an enlarged view of part of the apparatus shown in FIG. 1.

FIGS. 5 and 6 are diagrammatic views to show operation of an over-center locking feature.

DESCRIPTION OF PREFERRED EMBODIMENT

Referring first to FIG. 1, there are shown two lengths or workpieces of pipe, 11 and 13, abutted together for formation of a girth joint between them, as is done in building pipelines. These are large diameter pipes and, while they can be welded manually, they are preferably welded by automatic machinery of the general type described in the Nelson and Sims U.S. Pat. No. 3,461,264, or that described in Miller and Nelson U.S. Pat. No. 3,604,612 or both, or by use of a more advanced system, as described in the Nelson et al. U.S. Pat. No. 3,806,694, mentioned above. In these or in any analogous system where a band or track is used which surrounds the pipe or similar work-piece in a location reasonably close to the joint to be welded, and when the band or track is tightly secured, the present invention is applicable. As shown in the drawings, the two work pieces 11 and 13 abut end to end and they are each provided with a beveled end surface 15 or 17 presenting a suitable joint design for filling with electrode material. See also the enlarged detail in FIG. 2. Welding codes for pipe lines which are to carry fluids, such as oil or gas under high pressures, commonly are insistent that electrical grounding be in the joint itself, so as to make sure that if there is any arcing or pitting whatsoever this will occur in an area where the damage can be cured by the welding operation. Hence, according to the present invention, a grounding contact element 20, of brass, copper or other suitable good electrically conducting metal, is formed to a shape which will neatly contact and fit against the surface of the work. In this case, the contact element 20 is formed with a chisel-shaped end 21 which fits uniformly and smoothly to the adjoining bevel surfaces 17 and 15.

Pipe section 11 is surrounded by a tightly tensioned band 24. As described in the Miller and Nelson patent, and also in the Nelson et al. patent mentioned above, this tensioned band serves as a highly accurate guide track for the welding apparatus. The latter, which forms no part of the present invention, includes a self-propelled welding carriage designed to travel around the work and to effect as it travels a precision welding of the joint, under the accurate guidance of track or band Band 24 is annularly spaced from the work surface by small studs or spacers 25, secured at intervals to the under side of the band and resting on the surface of the work piece when the band is tensioned and firmly secured to pipe section 11. Advantage is taken of this strong tensioned band, in the present invention, to mount the grounding device to hold the ground contact in good, tight electrically conductive relationship with the joint. When the contact is locked in position for grounding, the high friction at the band holds and firmly locks the device in place.

To accomplish this, the ground contact elements 20 (of which two are shown in FIG. 1), are mounted in resilient bifurcate ends 26 and 27, respectively, of a sheet or plate of spring metal 75, of steel or brass or some other suitable material. It need not be electrically conducting and can be made of non-metal resilient material, if desired. Between the split or bifurcate ends 26 and 27, a stiff member 28 is secured. It may consist of an upper sheet of metal which is unitary with parts 26 and 27; if so, it is reinforced as by a backing element 23 riveted at 22, to stiffen it. It continues to the left, forming a tongue 29, as seen in FIGS. 1, 3 and 4, which can be inserted in a space between studs 25 and between the tensioned bands 24 and work piece 11. Normally the band 24 will have two rings or rows of studs 25; it may have more. In any case when an over-center device releases tension, tongue 29 of stiff member 28 can be slid freely beneath the band 24. When pressure is applied by the over-center mechanism, FIGS. 5 and 6, member 28, 29, serves as a firmly locked cantilever, applying grounding pressure to the contact elements which engage the grooved joint, FIG. 2. The manner of applying this pressure and the operating means which apply it selectively will now be explained.

An antifriction bearing 30, which may be a conventional ball or roller bearing, has its inner race 31 secured by side screws 32 and 33 to a lever arm 34. The outer race 35 of this bearing is firmly tied to the stiff tongue member 28, near the right end thereof, as seen in FIGS. 1, 3 and 4. It is shown in FIG. 3 as resting on a plate 36 fastened to or integral with member 28. A strap of metal 38 is fastened at both ends to member 28, passing around the upper periphery of outer race 35. It holds the bearing securely on top of member 28. The inner race 31 is freely rotatable, of course, within the outer race. Hence lever arm 34 can be freely moved from its full line or over-center locking position, FIGS. 3 and 6, to the dotted line or break contact position (see FIG. 5) and vice versa.

An axle member 40, extending transverse to the relatively fixed and rigid tongue member 28 and parallel to the axis of the bearing 30, is mounted firmly and rigidly to lever arm 34 and extends through the inner race 31 but eccentrically to this race. Axle member 40 bears a wheel or roller 41, 42 on either end, FIG 3; these are arranged to bear respectively on the upper surfaces (as seen in FIG. 3) of the resilient bifurcate elements 26 and 27. The latter tend normally to spring upwardly or away from the work member 11 and from joint surfaces 15, 17, as seen in dotted lines, FIG. 3, see FIG. 5. Rollers 41, 42 hold them down when axle 40 is moved to over-center position, below and beyond the center 39 of race 31.

The contact elements 20 are firmly secured to the right ends of the resilient spring plates or bifurcate members 26 and 27 but are electrically insulated therefrom. As shown in FIG. 2, each of the contact elements 20 is in form a threaded bar or rod bearing a lower or inner nut 51, an insulating washer 52 which rests against the inner or under surface of a bifurcate member 26 or 27, another insulating washer 53 above or outside the member 26 or 27, the end of a grounding cable 55, and upper nut 57 which, when tightened, holds all these parts firmly together on contact member 20. The bifurcate member 27 of FIG. 3 (and member 26 is similar), has an hole or opening 58, FIG. 4, which is larger than the contact rod or member 20 and an insulating ring or sleeve 59 is located in this hole and held in place by washers 52 and 53, FIG. 2, so that there is no metal to metal contact between the rod 20 and the forked elements 26 or 27. Thus the bifurcate members and the rest of the device are electrically insulated. As shown in FIG. 4, the corresponding opening in leg or fork element 26 is also shown at 58'.

Obviously, when the lever 34 is in its clockwise or locking position as shown in full lines, FIG. 3, the wheels or rollers 41 and 42 are in their inner or "down" positions, bearing respectively on the bifurcate parts or legs 26 and 27, respectively. In this position, the contact members 20 are of course forced firmly into the gap or bevel between elements 15 and 17, the beveled end surfaces of the respective work pieces 11 and 13. A firm, clean and broad contact is thus assured. However, when the lever 34 is rotated counterclockwise to the dotted line or break position, FIG. 3, the wheels 41 and 42 are lifted, removing their pressure on the bifurcate members 26 and 27. These members spring up and remove the contact elements 20 from the groove or weld area to a non-contact position. When this is done, tension or pressure on the tongue extension 29, which is under band 24 and has had an upward thrust against the under or inner face of this band, is entirely removed. The whole device is then free to be slid out from under the band and removed entirely from the work, or it may be shifted to another circumferential position around the work, and relocated under another part of the band.

In a typical operation, the welding machine will run from the top of the joint to the bottom, forming a weld or a welding pass around half of the circumference of the joint. While this half circumference run is being done, the grounding device would be secured to an opposite side of the pipe or work assembly. After the first pass is completed, the welder apparatus normally is brought back up to the top of the pipe for welding the second side or half circumference of the joint and the ground device is simply shifted around to the newly welded or partly welded half of the joint. With most pipe welding operations, two or more passes will be performed on each half circumference. It may be necessary therefore to shift the grounding device three or four times, or more, before the welding is completed. With this grounding device, shifts of this type require only a second or two. By contrast, conventional grounding devices take much more time and are a serious impediment to rapid welding, as suggested above.

As shown in FIG. 1, there is a cable terminal 55 for each grounding element 20. These are terminal ends of separate cable elements 62 and 63, respectively, but the two cables may be combined into one at 64, as shown. The other end of the cable, not shown, is of course secured to the generator or other source of welding power, which is conventional and forms no part of this invention. Current flows to the welding machine, into the joint and back through the grounding device (or vice versa) proceeds with minimal resistance and without any of the objectionable arcing which occurs with poor grounding.

In cases where there is no objection to grounding to the work at some point away from the joint, the grounding device can be held in the same manner by use of a strongly tightened band. The contact elements 20 themselves are shaped appropriately to give good contact with the work. Obviously, these elements 20 can be readily ground or cut to fit any desired surface contour and by use of pressure means can be held firmly in contact with any part of the work. Instead of eccentric 31, etc. a toggle might be used. When the situation does not require grounding at the joint, another band such as 24, or any equivalent device, can be secured at some position further from the joint, if that is helpful, making replacement of the ground unnecessary. Thus, the whole joint can be welded in as many steps as necessary without moving the ground device at all.

Obviously, where there are other types of holding devices available, they can be used in lieu of the band 24, but for convenience, they should surround the work piece, especially in cases of pipes and analogous shapes, and hence should be the equivalent of an essentially unyielding peripheral band spaced from the work a suitable distance to permit simple and easy insertion of the tongue extension 29. Also, instead of the particular threaded bolt or rod type contact elements 20, other shapes can be used, so long as they make appropriate and low resistance contact with the joint or other surface to be grounded. One reason for specifying contact with the joint itself, rather than some other part of the work surface, is that this is usually a freshly cut area and hence better suited for grounding. Aside from this, as noted above, the major reason usually is that the welding codes or specifications for high pressure pipe lines require it. While this invention obviously is not limited to use on pipelines or for pipeline welding, this is a major and important use. It can obviously be used in welding tanks and other vessels, piling, and any other shapes where there is available a holding band of high strength and firmness which is suitably spaced from the work to permit and facilitate use of this pressure applying grounding device. As noted above, the band may have a major function of guiding the welding carriage or apparatus, the function of holding the grounding device being minor or incidental, or the band, of the type shown or any suitable variant which is equivalent for the purpose, may be used only to hold the device. The grounding device is much more suitable and convenient to use where such a band is present. It permits quick placing of the device at any desired point around the periphery of the work.

FIGS. 5 and 6 show respectively a "break-contact" and a "make-contact" condition, the lever 34, however, being shown as extending in the reverse direction compared by to FIG. 3, so that the contact is closed by swinging it counterclockwise; this is merely a minor modification of FIG. 3 to show the respective positions more clearly.

Obviously, also, the number as well as the specific shape of the contact elements 20 can be varied to obtain the desired current density or the required low resistance level. The grounding cables and their connections, of course, are selected of adequate capacity for the current to be carried.

It will be obvious, furthermore, that other modifications and embodiments will suggest themselves to those skilled in the art which are equivalent or substantially equivalent to the features, parts and functions described. It is intended by the claims which follow to cover such equivalents and variations as broadly as the state of the art properly allows.

What is claimed is:

1. A grounding device for electric welding apparatus operating on a hollow work piece such as a pipeline or the like comprising, in combination, a work contacting element, means connecting said contact element to a device to be grounded to the work, a resilient holder for said contact element which is adapted when free to spring away and remove the element from grounding contact with said work piece, a relatively fixed and rigid member supporting said resilient holder and having an extension adapted to be held in a fixed position with respect to said work piece, operating means between said rigid member and said resilient holder for selectively locking the resilient holder in a position for making clean low resistance grounding contact with the work piece or allowing the resilient means to break contact and retaining means surrounding said work piece and annularly spaced therefrom for firmly retaining said extension by friction while the operating means is in said locking position, while freely permitting insertion or removal of said extension between the retaining means and the work when the operating means is in a free break-contact position.

2. A device according to claim 1 in which there are spaced forked resilient holders each carrying a contact element and being secured to said rigid member and wherein the operating means includes means for applying separate pressure from said rigid member to each of said resilient holders.

3. A device according to claim 2 in which the operating means comprise eccentric and rotatable means for mounting a pair of rollers, each of said rollers being mounted in position to separately apply pressure to one of said resilient holders.

4. A device according to claim 1 in which the operating means comprises an anti-friction bearing having an inner race and an outer race and a pressing device eccentrically mounted to said inner race and having means for rotating the inner race of the bearing with respect to the outer, for said selectively pressing and releasing the resilient holder and thereby selectively locking and breaking said contact.

5. A device according to claim 4 in which the pressing device includes an axle mounted within the inner race of the bearing and a rotating lever secured to the inner race for turning said inner race with respect to the outer race of said bearing.

6. A device according to claim 1 in which the resilient holder is a bifurcate spring plate holding a grounding contact element in the free end of each fork, wherein the annularly spaced retaining means is a band supported by spacing studs which abut the work piece, and wherein an eccentric operating means secured to the fixed and rigid member is adapted selectively to depress the bifurcate plate and thereby to press the contact elements into grounding contact with the work or to permit the resilient bifurcate free ends to spring free and thereby break the contact.

7. A device according to claim 6 in which the rigid member is a tongue insertable between the retaining means or guiding band for a welding machine and the workpiece and said tongue is dimensioned also to fit between adjacent pairs of said support studs which space said band away from said work piece.

8. A device according to claim 1 in which the retaining means comprises a guide track or band for an orbitally moving welding apparatus, which band is spaced from the work piece sufficiently to permit insertion of said extension element between the band and the work piece when the operating means is in contact break position, and in which the extension element is strongly held by friction between said band and work piece only when the operating means is in the grounding contact position.

9. A device according to claim 8 in which the operating means comprises an anti-friction bearing having inner and outer races, a rotating lever secured to said inner race, and an axle mounted to said lever eccentrically with respect to said inner race and parallel to the axis of said bearing, said axle bearing pressing roller means for depressing the resilient holder against its inherent resiliency and thereby by reaction frictionally locking the extension under the band when the axle is moved to an over-center position with respect to said inner race.

10. A device according to claim 1 in which the operating means comprise a lever rotatable to an over-center position, said lever bearing a pressing element for locking the work contacting elements in make-contact position when in said over-center position.

* * * * *